United States Patent [19]

Morita et al.

[11] Patent Number: 5,034,816

[45] Date of Patent: Jul. 23, 1991

[54] TELEVISION RECEIVER

[75] Inventors: Katsumi Morita, Suita; Mitsuo Isobe, Osaka; Yuichi Ninomiya, Kawasaki; Seiichi Gohshi, Komae, all of Japan

[73] Assignees: Matsushita Electric Industrial Co., Ltd.; Nippon Hoso Kyokai, both of Japan

[21] Appl. No.: 438,039

[22] Filed: Nov. 20, 1989

[30] Foreign Application Priority Data

Nov. 22, 1988 [JP] Japan .................................. 63-294925
Nov. 22, 1988 [JP] Japan .................................. 63-294926

[51] Int. Cl.$^5$ ............................................. H04N 5/16
[52] U.S. Cl. ....................................... 358/160; 358/133
[58] Field of Search ................ 358/160, 133, 105, 13, 358/167

[56] References Cited

U.S. PATENT DOCUMENTS

| 4,272,787 | 6/1981 | Michael et al. | 358/105 |
| 4,494,140 | 1/1985 | Michael | 358/105 |
| 4,551,753 | 11/1985 | Nishizawa et al. | 358/138 |
| 4,692,801 | 9/1987 | Ninomiya et al. | 358/138 |
| 4,752,826 | 6/1988 | Barnett | 358/160 |
| 4,912,556 | 3/1990 | Hirauchi et al. | 358/138 |

FOREIGN PATENT DOCUMENTS 62-46386 5/1985 Japan .

OTHER PUBLICATIONS

Ninomiya et al, "An HDTV Broadcasting System Utilizing a Bandwidth Compression Technique—MUSE", IEEE Transactions on Broadcasting, vol. BC-33, No. 4, Dec. 1987, pp. 130–160.
Development for the Muse System, vol. 39, No. 2, 1987, NHK Technical Bulletin.

Primary Examiner—Howard W. Britton
Assistant Examiner—David E. Harvey
Attorney, Agent, or Firm—Stevens, Davis, Miller & Mosher

[57] ABSTRACT

A television receiver is provided with two field memories for storing movement control signals, an OR circuit, a frame memory for storing the present and previous fields, a pair of switches controlled by a freeze signal, a switch controlled by the output signal of the OR circuit, and another switch for changing over its output signal to and from the output signal from the switch controlled by the OR circuit and the signal from the frame memory representing the present field. One frame's worth of video signals of the present field and the previous field are stored in the frame memory by a freeze signal. The signals stored in the frame memory provide a freeze picture having no multi-line dimness by virtue of using the present field and the previous field for the still picture image portion and the present field for the moving picture image portions of the present field and the previous field.

3 Claims, 5 Drawing Sheets

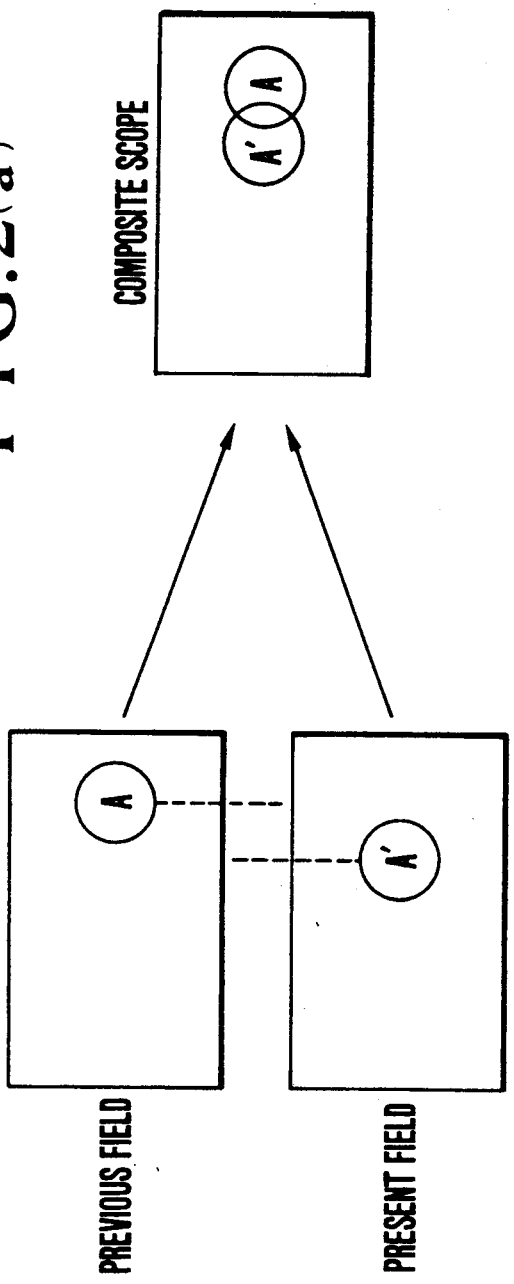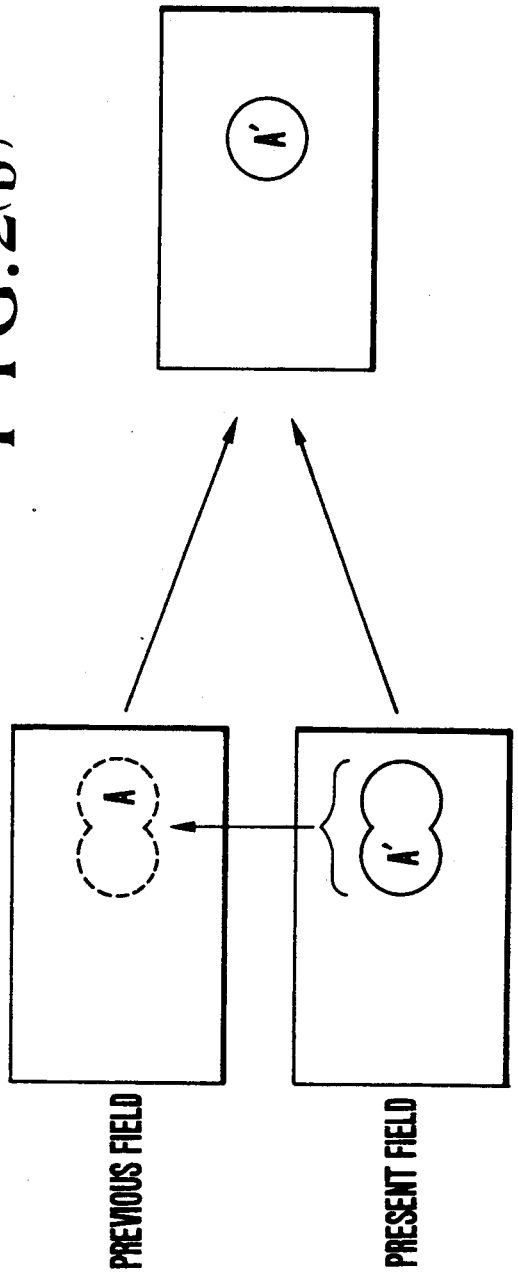

TELEVISION RECEIVER

BACKGROUND OF THE INVENTION

The present invention relates to a receiver of a multiple subsample transmission signal having a freeze function.

A "MUSE system" has been proposed as one of the methods for compressing a band of a wideband video signal such as a high grade television signal. Full particulars thereof are given in, for example, NHK Technical Bulletin "Development FOR THE MUSE system" vol. 39, No. 2 1987. In this MUSE system, a video signal is subjected to offset sampling between fields, frames and lines, and the band is compressed through the processing in which a sampling phase makes a round in four fields. Therefore, in the receiver, transmitted video signals that are transmitted in consecutive order over four fields are stored by providing a frame memory, and these are composed thereby to restore to an original high grade television signal. A related art of a television receiver of the MUSE system will be described with reference to FIG. 1.

A digitized video signal is supplied to a signal input terminal 10. In a still picture processing circuit 11, after conducting interpolation between frames using the frame memory, interpolation between fields is conducted so as to restore a still picture image and to send it out to a mixing circuit 14. On the other hand, in a moving picture processing circuit 12, field interpolation is conducted so as to restore a moving picture image and to send it out to the mixing circuit 14. A movement detecting circuit 13 detects a moving portion by using frame correlation of the video signals, and supplies a movement control signal to the mixing circuit 14. In the mixing circuit 14, an output signal of the still picture processing circuit 11 and an output signal of the moving picture processing circuit 12 are mixed with each other at a predetermined ratio in a picture element unit corresponding to the movement control signal so as to conduct restoration. The output signal of the mixing circuit 14 is restored to such a picture quality that is suited to be put to practical use, but processing in the time base direction is performed in a temporal circuit 15 in order to restore it further completely. The temporal circuit 15 is composed of a temporal arithmetic circuit 16 and a frame memory 17. A low-frequency band component of the output signal of the mixing circuit 14 is separated by a two-dimensional space filter in the temporal arithmetic circuit 16, and a high-frequency band component is subjected to band limit in the time base direction by a temporal low-pass filter composed of the temporal arithmetic circuit 16 and the frame memory 17, and composed with the original low-frequency band component thereafter in the temporal arithmetic circuit 16, thus obtaining a restored high grade television signal at an output terminal 18.

In such a receiver as described above, however, there has been a problem that it is impossible to display any display scope under a still state, that is, to perform so-called freeze display.

SUMMARY OF THE INVENTION

In view of the problem as described above, it is an object of the present invention to provide a television receiver which is capable of freeze display having no double image, viz., so called multi-line dimness.

According to the present invention, there is provided a television receiver comprising two field memories for storing movement control signals, an OR circuit, a frame memory composed in the unit of field, two switches controlled by a freeze signal, a switch controlled by an output signal of the OR circuit, and a switch for changing over the output signal of this switch to and from the output signal of the field memory.

With the abovementioned structure according to the present invention, one frame's worth of video signals of a current field (present field) and a field before the current field (previous field) are stored in the frame memory in response to the freeze signal. The signals stored in the unit of the field provide a freeze scope having no multi-line dimness by using the present field and the previous field for still picture image portions and the present field for moving picture image portions of the present field and the previous field.

As described above, according to the present invention, a freeze picture image having a good picture quality with no multi-line dimness is obtainable by using two continuous field signals for the still picture image portion and a single field signal for the moving picture image portion.

BRIEF DESCRIPTION OF THE DRAWINGS

FIGS. 2(a) and 2(b) show schematic explanatory views for explaining the operation of an embodiment according to the present invention;

DESCRIPTION OF THE PREFERRED EMBODIMENTS

Embodiments of the present invention will be described hereafter with reference to the drawings, but the outline of the operation thereof will be described first with reference to FIG. 2 to gain a better understanding thereof.

In FIG. 2, it is assumed that a moving object which was located at A in the previous field has moved to A' in the present field. When these two fields are simply composed and displayed in one picture scope, the portion which has moved is doubled, thus causing so-called multi-line dimness and producing an unnatural picture image as shown in FIG. 2(a). Therefore, in the present invention, for example, all of the present field is displayed regardless of the still picture image portion and the moving picture image portion in an odd field. In an even field, the previous field is displayed for the still picture image portion and A' in the present field is displayed for the moving picture image portion, and the present field is displayed for the still region of the previous field which is missing by displaying A' in place of A, thereby to obtain a picture image having no multi-line dimness as shown in FIG. 2(b).

Figure 1:
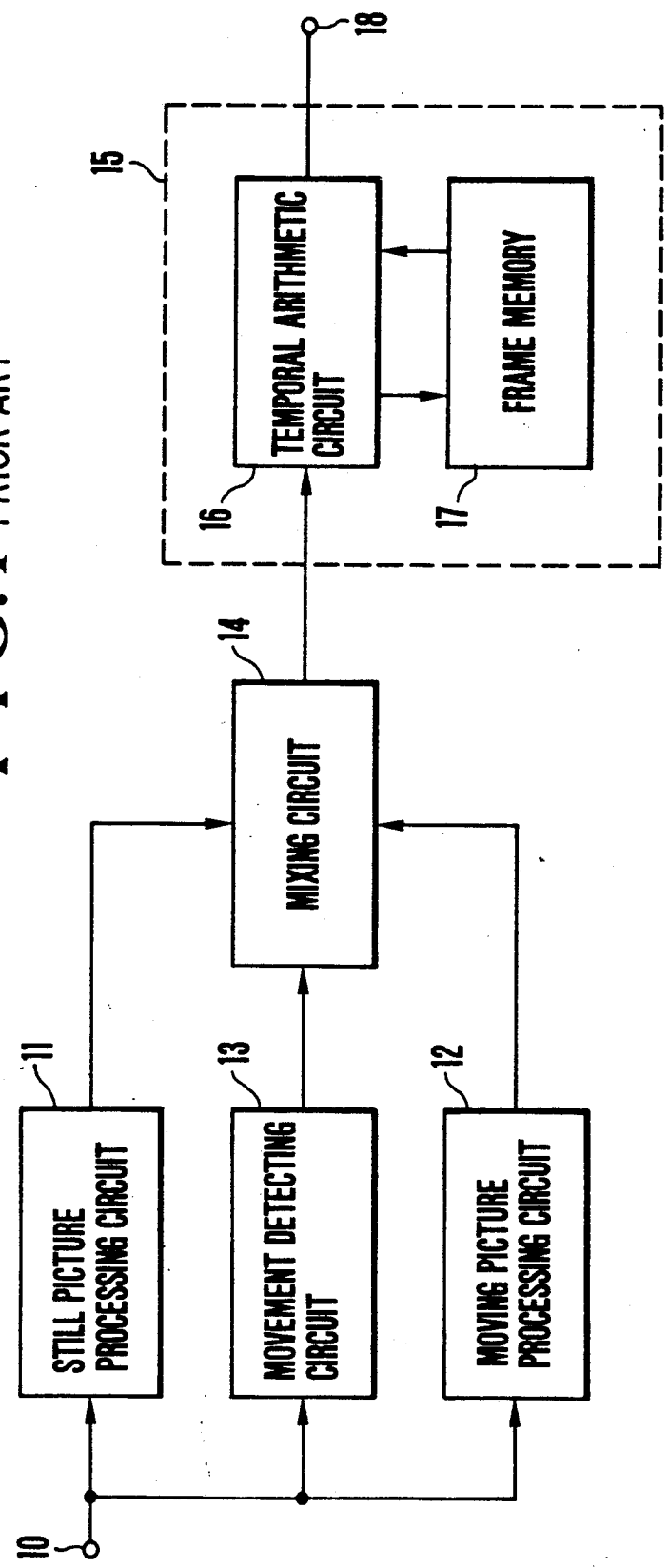
FIG. 1 is a block diagram of a conventional television receiver.
Figure 3:
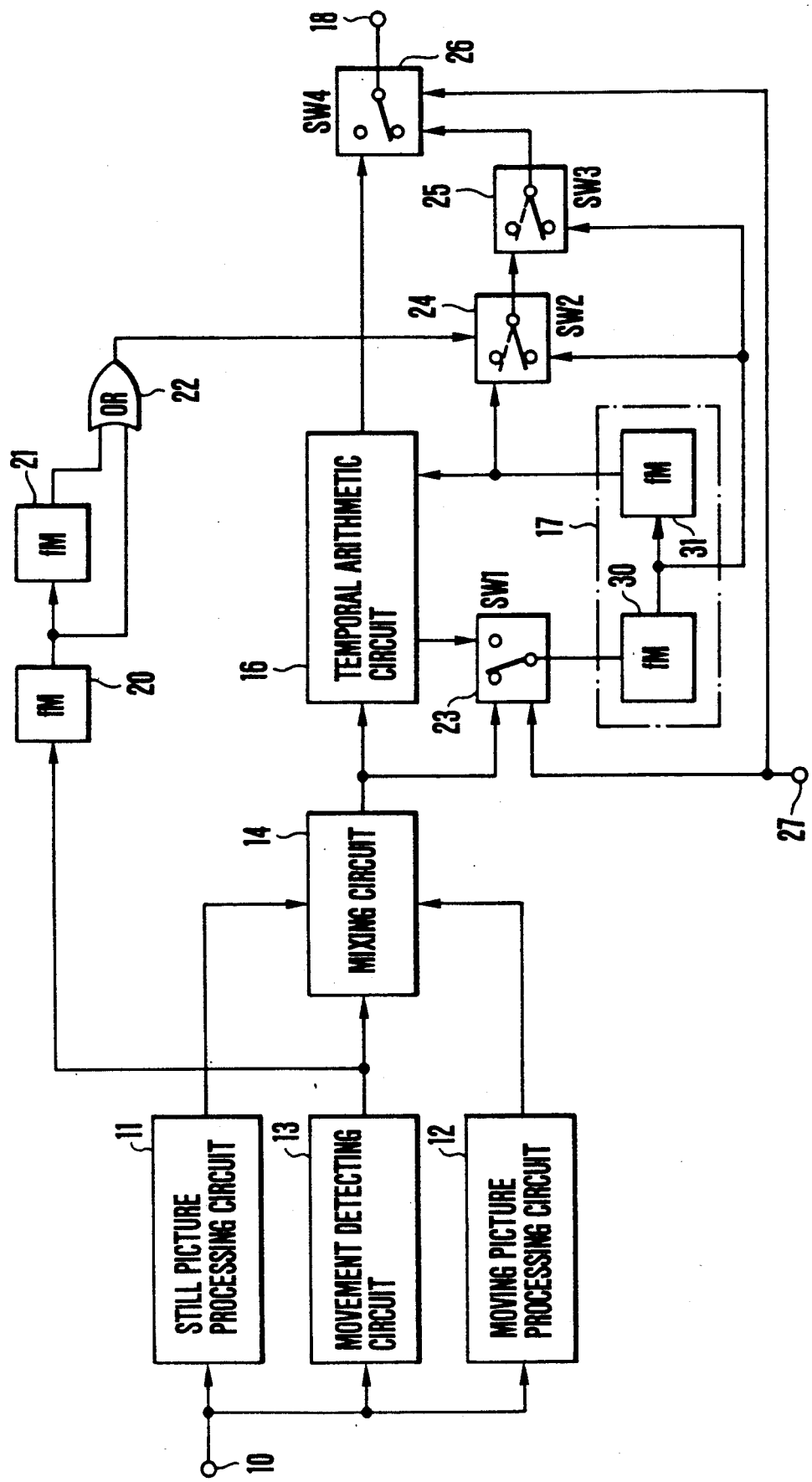
FIG. 3 is a block diagram showing an embodiment of a television receiver according to the present invention.

FIG. 3 shows a block diagram showing an embodiment of a television receiver according to the present invention. Same numbers are assigned to those parts that have the same functions as the parts shown in FIG. 1 which shows a conventional device.

In FIG. 3, 20 and 21 designate field memories for storing movement control signals from the movement detecting circuit 13, 22 designates an OR circuit for obtaining a logical sum of movement control signals stored in the field memory 20 and the field memory 21, 23 through 26 designate switches, 27 designates an input terminal of a freeze signal for obtaining a freeze scope, and 30 and 31 are field memories constituting a frame memory 17.

The operation of the television receiver of the present embodiment thus structured will be described hereafter. First, incorporation of a freeze scope will be described. When a freeze signal arrives at the input terminal 27 of the freeze signal, respective switches 23 through 26 present the states shown with solid lines. One frame's worth of video signals from the mixing circuit 14 are stored in the frame memory 17 through the switch 23. The frame memory 17 is composed of two field memories 30 and 31, and the present field and the previous field are stored in the field memory 30 and in the field memory 31, respectively.

One frame's worth of another movement control signals from the movement detecting circuit 13 are stored in the field memories 20 and 21. Next, readout from the frame memory 17 is described. Now, it is assumed that an odd field is the present field and an even field is the previous field. The video signals of the odd field are obtained with the output signal of the field memory 30 at the output terminal 18 through the switch 25 and the switch 26. Besides, the switch 25 is changed over field after field. Next, at the time of an even field, the switch 25 is connected to the terminal opposite to that shown in the figure. To the switch 24, video signals of the present field stored in the field memory 30 and video signals of the previous field stored in the field memory 31 are supplied.

Movement control signals of the present field are stored in the field memory 20, and movement control signals of the previous field are stored in the field memory 21. A logical sum of stored movement control signals of the present field and the previous field is obtained by an OR circuit 22 and becomes a still picture movement control signal which shows moving portions of the present field and the previous field. At an output terminal of the switch 24 which is controlled by the still picture movement control signal, the signals of the previous field stored in the field memory 31 are obtained for the still portion, and the signals of the present field stored in the field memory 30 are obtained for the moving portion. The signals obtained at the output terminal of the switch 24 are sent to the output terminal 18 through the switch 25 and the switch 26.

Figure 4:
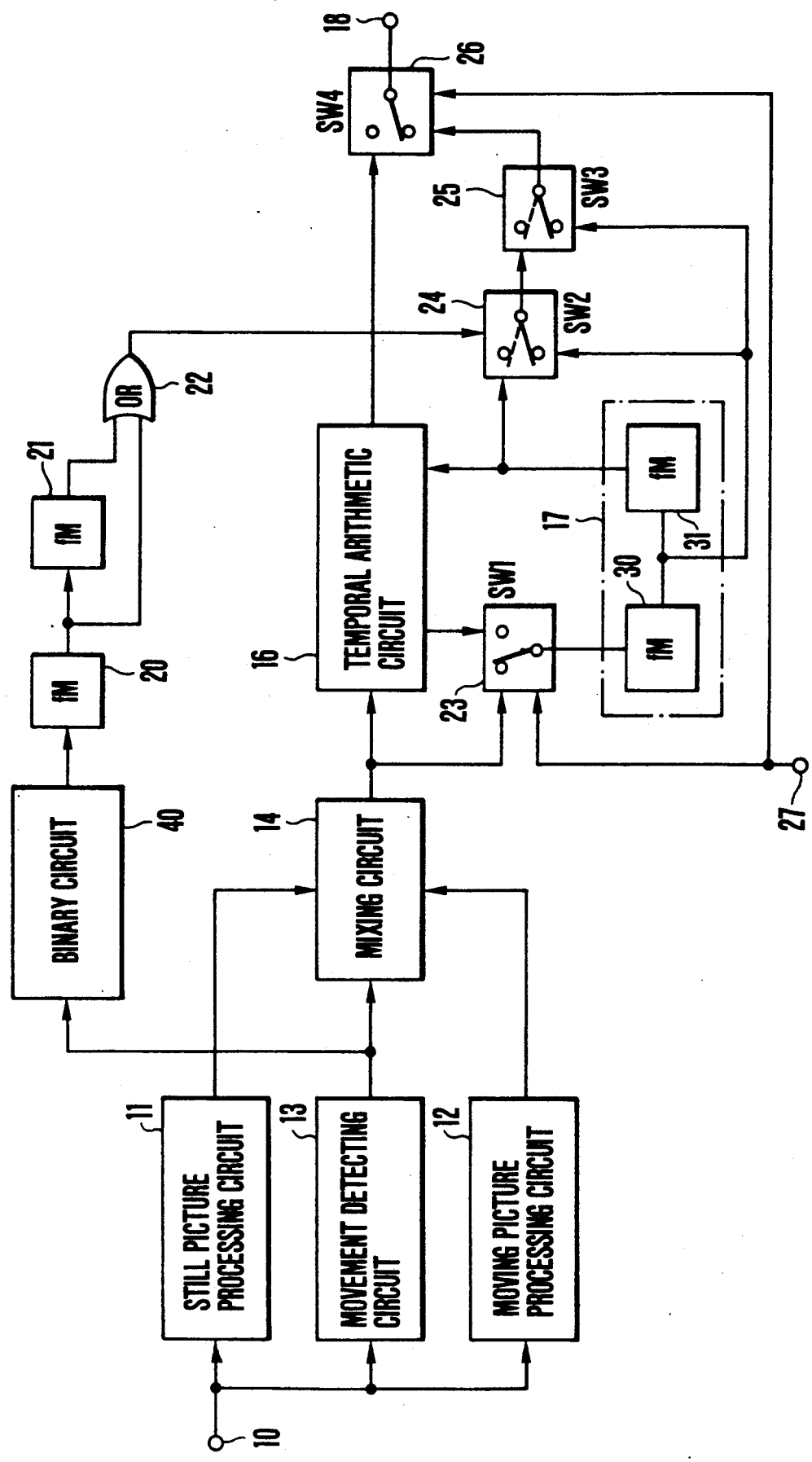
FIG. 4 and FIG. 5 are block diagrams showing other embodiments of a television receiver according to the present invention.

FIG. 4 is a block diagram showing a second embodiment of a television receiver according to the present invention. The difference from the structure shown in FIG. 3 exists in that a binary circuit 40 is provided at the input terminal of the field memory 20.

An original movement control signal is composed of several bits for the purpose of performing fine control. In the case of the operation of changing over switch 2 of 24 as in the present invention, however, it is possible to accomplish the purpose with binary operation. Therefore, according to the present invention, there is provided the binary circuit 40 which makes the movement control signal binary at the input terminal of the field memory 20, thereby to realize low capacity of the field memories 20 and 21.

The movement control signal in N bits can be made binary by a method in which a comparator of N bits is provided so as to compare with a certain threshold value, a method of judging the existence of the movement control signal by an OR circuit having an N bit input, or a method of using the MSB of N bits, etc.

Figure 5:
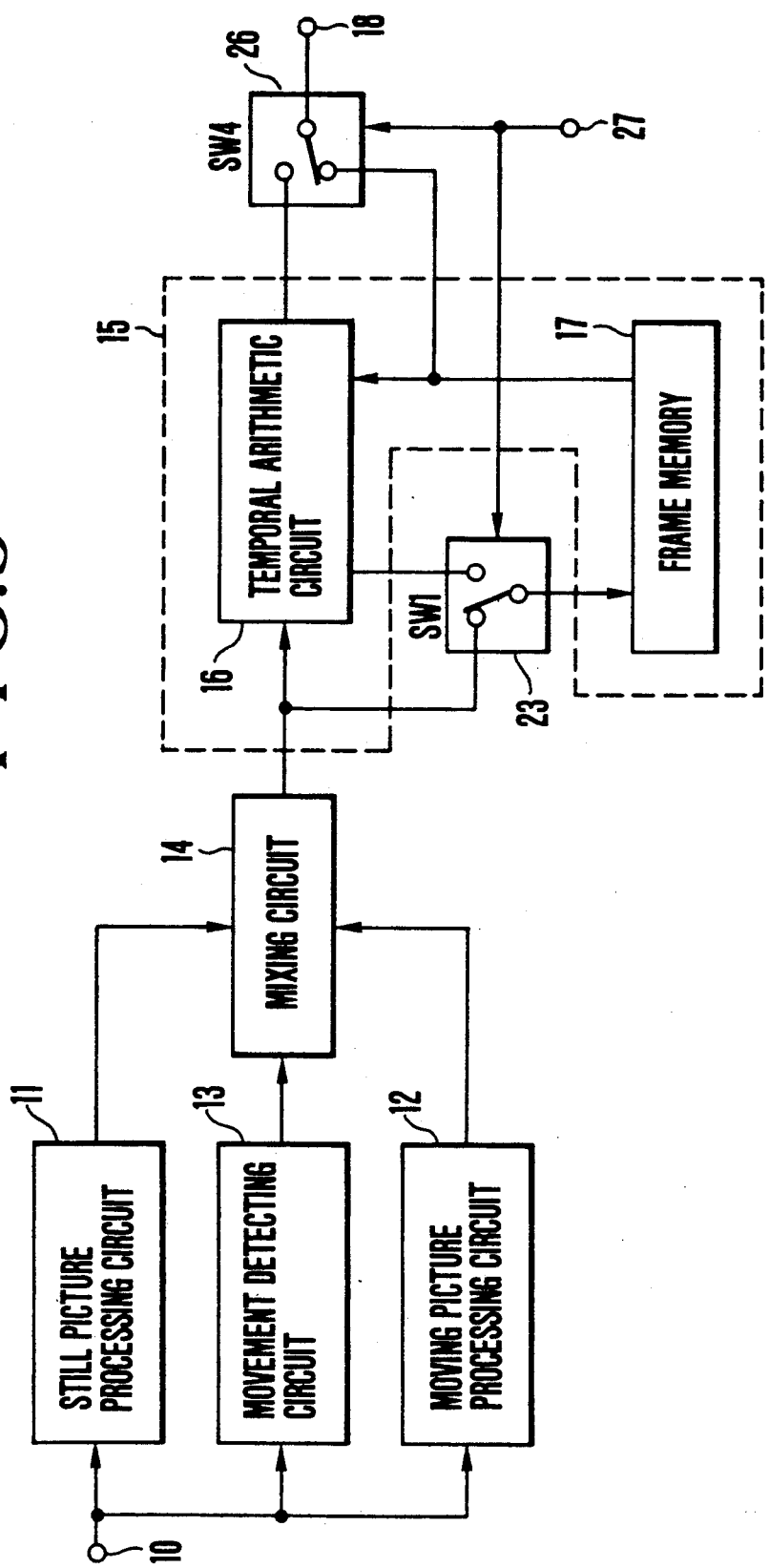

FIG. 5 is a block diagram showing still another embodiment of a television receiver according to the present invention. In FIG. 5, 23 designates a switch which changes over the output signal of the mixing circuit 14 to and from the signal from the temporal arithmetic circuit 16, 26 designates a switch which changes over the output signal of the frame memory 17 to and from the output signal of the temporal arithmetic circuit 16, and 27 designates an input terminal of a freeze signal for obtaining a freeze scope.

In the television receiver of the present embodiment structured as described above, when a freeze signal arrives at the input terminal of the freeze signal, the switch 23 and the switch 26 present the states as shown. The output signals of the mixing circuit 14 are stored in the frame memory 17 through the switch 23. The video signals stored in the frame memory 17 are read out repeatedly, and sent out to the output terminal 18 through the switch 26. Thus, video signals which have been restored and frozen to a high grade television signals are obtained at the output terminal 18. Besides, it is needless to say that, when switches 23 and 26 are connected the other way to those shown in FIG. 5, the same operation is performed as a conventional case.

As described above, according to the embodiment shown in FIG. 5, freeze display can be made only by adding two switches without requiring to provide newly a frame memory for freeze and without expanding the circuit scale so much.

We claim:

1. A television receiver for receiving multi-subsample transmission signals, comprising:
   A still picture processing circuit means for performing still picture image processing;
   a moving picture processing circuit means for performing moving picture image processing;
   a movement detecting circuit means for detecting a moving portion by utilizing frame correlation of video signals;
   a mixing circuit means for controlling a mixing ratio of the output signal of the still picture processing circuit means to the output signal of the moving picture processing circuit means in response to a control signal from the movement detecting circuit means;
   a temporal arithmetic circuit means receiving and processing an output signal from said mixing circuit means in the time-base direction to provide an output signal;
   a frame memory formed in the unit of field;
   a first switch means, responsive to a freeze signal, for switching its output between the output signal from the temporal arithmetic circuit and the output signal from the mixing circuit;
   a second switch means for switching its output between the output signal from said frame memory representing a present field and the signal from said frame memory representing a previous field;
   a third switch means for switching its output between the output signal of the second switch means and the output signal from said frame memory representing the present field;

a fourth switch means, responsive to said freeze signal, for switching its output between the output signal of the third switch means and the output signal of the temporal arithmetic circuit means;
a field memory for storing movement control signals of the present field;
a field memory for storing movement control signals of the previous field; and
an OR circuit for providing an output signal representing a logical sum of stored movement control signals of the present field and the previous field.

2. A television receiver according to claim 1, wherein the two field memories storing movement control signals comprise field memories storing movement control signals that are made binary.

3. A television receiver for receiving multi-subsample transmission signals, comprising:
a still picture processing circuit means for performing still region processing;
a moving picture processing circuit means for performing moving region processing;
a movement detecting circuit means for detecting a moving portion by utilizing frame correlation of video signals;
a mixing circuit means for controlling a mixing ratio of the output signal of the still picture processing circuit means to the output signal of the moving picture processing circuit means in response to a control signal form the movement detecting circuit means;
a temporal circuit comprising a temporal arithmetic circuit and a frame memory;
a first switch means for switching between the output signal from the temporal arithmetic circuit and the output signal from the mixing circuit; and
a second switch means for switching between the output signal form the frame memory and the output signal from the temporal arithmetic circuit;
the switching of the first switch means and the second switch means being controlled by a freeze signal.

* * * * *